United States Patent
Slavin et al.

(10) Patent No.: US 12,039,551 B2
(45) Date of Patent: Jul. 16, 2024

(54) SYSTEM AND METHOD FOR IMPLEMENTING A CONSOLIDATED CONTRIBUTIONS DATA BRIDGE FOR OUTBOUND TRANSIENT DATA AND FIXED-TERM REFERENCE DATA

(71) Applicant: JPMorgan Chase Bank, N.A., New York, NY (US)

(72) Inventors: Ilya Slavin, Allen, TX (US); Neil Law Crawford, Renfrewshire (GB); Ye Li, New York, NY (US); Stanislav Belotserkovskiy, Forest Hills, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 222 days.

(21) Appl. No.: 17/602,432

(22) PCT Filed: Apr. 12, 2019

(86) PCT No.: PCT/US2019/027246
§ 371 (c)(1),
(2) Date: Oct. 8, 2021

(87) PCT Pub. No.: WO2020/209865
PCT Pub. Date: Oct. 15, 2020

(65) Prior Publication Data
US 2022/0172232 A1 Jun. 2, 2022

(51) Int. Cl.
*G06Q 30/0201* (2023.01)
*G06Q 40/04* (2012.01)

(52) U.S. Cl.
CPC ......... *G06Q 30/0201* (2013.01); *G06Q 40/04* (2013.01)

(58) Field of Classification Search
None
See application file for complete search history.

(56) References Cited

U.S. PATENT DOCUMENTS

| 2006/0149840 | A1* | 7/2006 | Thompson | H04L 47/829 709/224 |
| 2007/0008927 | A1* | 1/2007 | Herz | H04W 84/18 370/331 |

(Continued)

FOREIGN PATENT DOCUMENTS

| JP | 2009-525539 | 7/2009 |
| JP | 2012-252430 | 12/2012 |

(Continued)

OTHER PUBLICATIONS

Extended European search report dated Oct. 13, 2022 issued in European patent application No. 19924098.7.

(Continued)

*Primary Examiner* — Jamie H Austin
(74) *Attorney, Agent, or Firm* — GREENBLUM & BERNSTEIN, P.L.C.

(57) ABSTRACT

An embodiment of the present invention is directed to a consolidated contributions data bridge. The innovative data bridge tool takes internally generated market data and reference data from an Internal data distribution platform. (IPP) and publishes the data externally. An embodiment of the present invention may be directed in a messaging system that monitors a real-time system, to provide various benefits of in-band management: of contribution platforms and similar systems.

18 Claims, 4 Drawing Sheets

(56) References Cited

U.S. PATENT DOCUMENTS

| | | | |
|---|---|---|---|
| 2009/0132335 A1* | 5/2009 | Pein | G06Q 30/0202 705/7.29 |
| 2012/0011054 A1* | 1/2012 | Grody | G06Q 40/00 705/37 |
| 2012/0089497 A1* | 4/2012 | Taylor | G06Q 40/04 705/35 |
| 2012/0259761 A1* | 10/2012 | Subramanian | G06Q 40/04 705/37 |
| 2013/0218739 A1* | 8/2013 | Kmiec | G06Q 40/04 705/37 |
| 2014/0222966 A1* | 8/2014 | Marins | H04L 67/02 709/219 |
| 2014/0304284 A1* | 10/2014 | Smith | G06F 16/95 707/756 |
| 2017/0300878 A1* | 10/2017 | Hansen | G06Q 30/0611 |
| 2020/0026710 A1* | 1/2020 | Przada | G06F 16/254 |
| 2022/0172232 A1* | 6/2022 | Slavin | G06Q 40/04 |

FOREIGN PATENT DOCUMENTS

| | | |
|---|---|---|
| WO | 2007/089820 | 8/2007 |
| WO | 2019/200236 | 10/2019 |
| WO | 2019200236 A1 | 10/2019 |
| WO | 2021002858 A1 | 1/2021 |

OTHER PUBLICATIONS

Japanese Office Action dated May 19, 2023, issued in Japanese Patent Application No. 2021-560245, along with corresponding English translation.
Notice of Allowance dated Jul. 28, 2023 issued in Japanese patent application No. 2021-560245, along with corresponding English translation.
International Searching Authority, PCT International Search Report and Written Opinion, International Application No. PCT/US19/27246, Jul. 3, 2019, pp. 1-9.

* cited by examiner

| 412 | 414 | 416 | Queries 410 | | | |
|---|---|---|---|---|---|---|
| Method | ● Query ○ Subscribe ○ Query and Subscribe | | | | | |
| 420 Topic | ▼ | Format 422 | | | | |
| 430 Filter | | | | | | |
| Bookmark 432 | | Order By 434 | Optional: Enter the ID | | | EXECUTE |
| | | | Queried a topic: FIX with a filter: "/source="XXX" 440 | | | |
| Key 442 | Data 444 | | | | | View |
| 1234 | source = ; symbol = ; | | | | | View |
| 1111 | source = ; symbol = ; | | | | | View |
| 8888 | source = ; symbol = ; | | | | | View |

Figure 4

SYSTEM AND METHOD FOR IMPLEMENTING A CONSOLIDATED CONTRIBUTIONS DATA BRIDGE FOR OUTBOUND TRANSIENT DATA AND FIXED-TERM REFERENCE DATA

CROSS REFERENCE TO RELATED APPLICATIONS

This application is a U.S. National Phase Application under 35 U.S.C. § 371 of International Application No. PCT/US2019/027246, filed Apr. 12, 2019, the contents of which is incorporated herein in its entirety.

FIELD OF THE INVENTION

The invention relates generally to a system and method for implementing a data bridge and more particularly to a consolidated contributions data bridge for outbound market and reference data.

BACKGROUND OF THE INVENTION

Large financial companies contribute a lot of information to information brokers to be distributed outside their firms. This information includes research reports, client statements, trade confirmations, responses to quotes, etc. The most actively moving and varied category is market data. Data in this category may include index valuations, indicative quotes, reference data for new securities, indications of interest, etc. Information changes at a variable pace per financial security and can move quickly.

For example, a financial entity may send data relating to financial instruments to various data brokers to be distributed to various market participants. This may include real-pricing on exchange-traded and Over the Counter (OTC) instruments, indicative prices of credit securities, values of investable indexes, etc. OTC securities do not trade on an open exchange, but rather through indication of interest and collaboration between counterparties.

In the age of information, financial institutions are concerned with entitlements controls, methods of consumption, cross-company content sharing, dangers of disclosure, etc. For the past decades, however, most financial entities have relied on available tools to transmit that information to a number of data brokers. However, those tools have not kept up with the times and lack security and control over sensitive market data.

These and other drawbacks exist.

SUMMARY OF THE INVENTION

According to one embodiment, the invention relates to a system that implements a consolidated contribution data bridge tool. The system comprises: a first interface that communicates with an internal data distribution platform (IDP); a second interface that communicates with a plurality of vendors; a third interface that communicates with one or more monitoring systems; and a server, coupled to the first interface, the second interface and the third interface, the server comprising a processor programmed to perform the steps comprising: receiving, via the first interface, IDP messages comprising market data and reference data; identifying a mapping between the IDP messages and a message format associated with a destination vendor; applying data normalization and transformation to the market data and reference data based on the mapping; transmitting, via the second interface, the market data and reference data to the destination vendor for publication; and transmitting, via the third interface, the market data and reference data to a real-time monitoring system.

According to another embodiment, the invention relates to a method that implements a consolidated contribution data bridge tool. The method comprises the steps of: receiving, via a first interface, internal data distribution platform (IDP) messages comprising market data and reference data, wherein the first interface that communicates with an internal data distribution platform (IDP); identifying a mapping between the IDP messages and a message format associated with a destination vendor; applying data normalization and transformation to the market data and reference data based on the mapping; transmitting, via a second interface, the market data and reference data to the destination vendor for publication, wherein the second interface that communicates with a plurality of vendors; and transmitting, via a third interface, the market data and reference data to a real-time monitoring system, wherein the third interface that communicates with one or more monitoring systems.

The system may include a specially programmed computer system comprising one or more computer processors, interactive interfaces, electronic storage devices, and networks.

The computer implemented system, method and medium described herein provide unique advantages to entities, organizations and other users, according to various embodiments of the invention. An embodiment of the present invention supports sending a large volume of messages from some internal data distribution system to one or more remote information brokers. Conventional tools are typically deployed when there are many internal data publishers sending data out, though could be used with a "one to one" flow. Unlike current systems, an embodiment of the present invention provides transparency to various aspects of this process while maintaining high level of efficiency. Specifically, the innovative system uses an Open Source API to consume information from an internal data bus, which means that any compatible distribution system can be used for messaging. It further provides the ability to send data out transparently for monitoring and management. An embodiment of the present invention may be directed to a messaging system that monitors a real-time system to provide various benefits of in-band management of contribution platforms and similar systems. An embodiment of the present invention may support decoupled components thereby reducing complexity and permitting emergence of features that otherwise would adversely impact throughput and performance. Moreover, due to the decoupled nature of monitoring/logging and transmission, the data bridge tool supports strict outbound data controls by connecting a monitoring infrastructure with a data entitlements system. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a data bridge tool that takes internally generated market data and reference data from an internal data distribution platform (IDP) and publishes the data externally. The data bridge tool that may be connected to an internal data distribution platform (e.g., Solace, etc.) via an API (e.g., open source OpenMAMA API). The data bridge tool may subscribe to a series of topics. Topics may be referenced through a "chain" header and/or directly to collect information to be sent outside an entity that implements the data bridge tool. Because the information may be transient in nature, it may not exist at the time of the subscription. Accordingly, the data bridge tool may detect the appearance of new information and respond accordingly, as well as handle the case when information is removed from the data source temporarily. Once data is collected by the data bridge tool, the data may be further processed. This may involve a series of normalizations and/or transformations to be converted into a protocol supported by a specific destination where the entity wishes to send the data.

For example, reference data may represent data that does not change over time. For a newly issued bond, the bond may have a number of associated reference data points, such as maturity, yield and size. These reference data points may not change until the bond matures, e.g., 30 years later. Other information may have a much shorter lifespan. This type of information may be replaced by a next update, e.g., within seconds, minutes, etc. Accordingly, some data is transient in nature where users are concerned with a current value at a most recent point in time.

Figure 1:
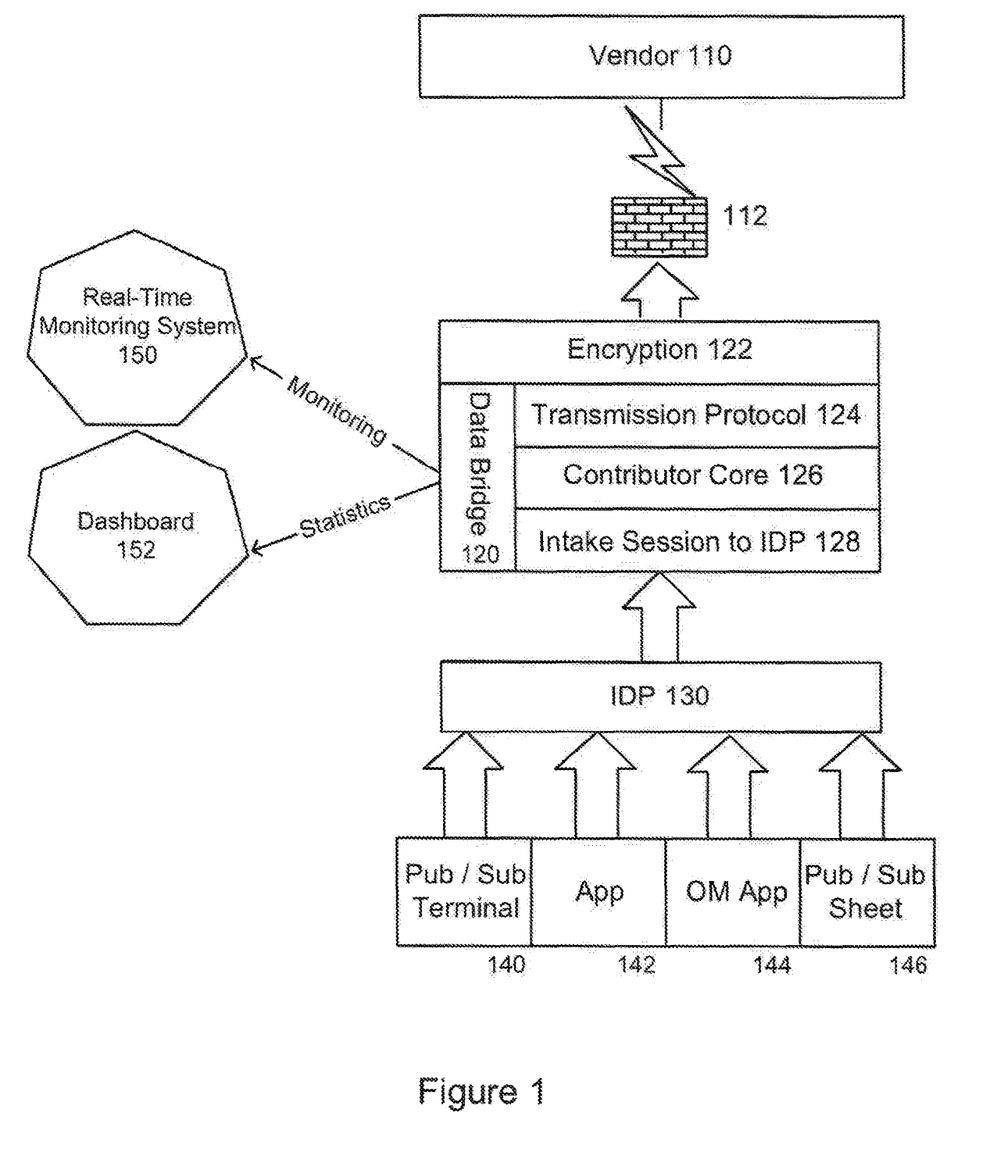
FIG. 1 is an exemplary system architecture of a contribution data bridge, according to an embodiment of the present invention.

Once the data transformed, it may be sent out of the entity. In addition, the data may be sent internally via a message bus to a monitoring system. An embodiment of the present invention allows multiple internal parties, including Operate teams and data producers, to access and/or analyze real-time state of per-topic data transmission and transformed payload that content may be normalized to. Operate teams may have an option of using a monitoring system to cause certain actions inside of the data bridge tool. Actions may include re-subscription to specific topics, re-sending data to vendors, etc. As shown in FIG. 1, Monitoring system 150 and Dashboard 152 are separate components. The monitoring system provides Operate teams a real-time status on the health of the application based on a series of applied metrics. If the Monitoring system indicates an issue with the system, the Operate teams may investigate and may use multiple tools and/or source of information (e.g., server, application log files, etc.), including the Dashboard to diagnose and resolve the issue. The Dashboard provides access to a last value cache of subscribed and transmitted data and other application metrics. The Dashboard may be used to access and/or analyze real-time state of per-topic data and is used to perform actions on this data. The data bridge tool may be designed to support global operations, where data from global producers may be moved to a centralized highly available systems. This may reduce complexity, lower operational burdens, and decrease long-term costs. Accordingly, an embodiment of the present invention may realize centralized management, real-time status monitoring on per-topic basis, high throughput, high availability, latest protocols and lower cost.

An embodiment of the present invention may be directed to a messaging system that monitors a real-time system to provide various benefits of in-band management of contribution platforms and similar systems. According to an exemplary scenario, the monitoring may happen completely out-of-band. An embodiment of the present invention may support decoupled components thereby reducing complexity and permitting emergence of features that otherwise would adversely impact throughput and Total Cost of Ownership (TCO). A tightly coupled monitoring system reduces throughput of the primary function, which is transformation and transmission of messages. A loosely bound out-of-band system does not "push back" on the primary function, since it does not mind being delayed if the load gets too high. Tightly bound systems tend to be rigid, requiring more infrastructure to meet the required volumes as opposed to loosely bound ones.

Due to the decoupled nature of monitoring/logging and transmission, an embodiment of the present invention may enable strict outbound data controls by connecting a monitoring infrastructure with a data entitlements system.

The Consolidated Contributions Data Bridge described herein may be combined with Market Data Hub, as described in patent application PCT/US19/27185, filed Apr. 12, 2019, which claims priority to U.S. Provisional Application 62/656,585 and/or may be further integrated with Global Contribution Analytics Tool, as described in the international patent application No. PCT/US19/40488. filed Jul. 3, 2019, the contents of which are incorporated by reference herein in their entirety. For example, Consolidated Contributions Data Bridge may send contributions data to various destinations, including Market Data Hub. Global Contribution Analytics Tool may analyze contributions data and further create visibility and analytics. In addition, the Market Data Hub may also be implemented by Distributed Ledger Technology, as described in U.S. Provisional Application No. 62/833,019, filed Apr. 12, 2019, the contents of which are incorporated herein in its entirety.

FIG. 1 is an exemplary system architecture of a contribution data bridge, according to an embodiment of the present invention. As shown in FIG. 1, Data Bridge Tool 120 may publish contribution data externally to one or more Vendors, represented by 110. Data Bridge Tool, represented by 120 may provide functions, represented by Encryption 122, Transmission Protocol 124, Contributor Core 126 and Intake Session to IDP 128.

Data Bridge Tool, represented by 120, may take internally generated market data and reference data from an internal data distribution platform (IDP), represented by 130, and publishes it externally, via Firewall 112. Firewall 112 may be optional and thereby allow connections to external sources to be connected by the same application. The data bridge tool may leverage industry standard FIX messaging, or other Transmission Protocol as agreed upon with the specific Vendor, represented by 124, and an API (e.g., open source OpenMAMA API) to provide a flexible, vendor agnostic and performant data bridge to send this data to multiple market data vendors for consumption by customers. FIX may represent a financial information exchange.

IDP may receive data from various sources, including Publication/Subscription (Pub/Sub) Terminal 140, App 142, OM App 144 and Pub/Sub Sheet 146. Publication/Subscription (Pub/Sub) Terminal 140, which is an application, typically written by a third party, may provide internal users a graphical interface that subscribes to information from one or more sources and displays it in a functional way for the user, as well as publishing data either directly or indirectly to IDP 130. App 142 represents an application, developed internally or by a third party, which communicates indirectly with IDP 130. Such application may or may not have a graphical user interface, and may not subscribe to any information IDP. It would, however, publish information to IDP. OM App 144 represents an application similar to 142, but may be written to communicate directly with IDP 130. Such application may or may not subscribe to data, but is expected to publish it. Pub/Sub Sheet 146 is an embodiment of App, but is specifically pointed out to work within a graphical interface of another unrelated application, such as Microsoft Excel. Such Sheet may represent an application running within context of another, or utilize a feature of the application itself, such as a formula. As is with App 142, Sheet is not required to subscribe to information from IDP, but is expected to publish it. Other sources of data may be implemented.

The data bridge tool may provide data normalization and transformation between the Intake Session and Transmission Protocol Session components based on rules and/or mappings which may be defined within main configuration files, for example.

Data encryption, represented by 122, may be tailored to specific vendor requirements. For example, the data bridge tool may utilize Transport Layer Security (TLS) and certificates providing data privacy and integrity over private network connections.

Data Bridge 120 may communicate monitoring data and statistics data to one or more analytics tools and/or interfaces, represented by Real-Time Monitoring System 150 and Dashboard 152. The data bridge may accomplish this function by interfacing with a message bus where monitoring, reporting and/or analytics components provide real-time, out-of-band monitoring and management features which may be made available to various users, e.g., Business and Operate teams, without impacting the throughput of the system. As shown in FIG. 1, the monitoring functionality supported by 150, 152 may be decoupled from the transmitting to vendors functionality, represented by Vendor 110.

Data Bridge 120 may include various processing components, including Server Component, Subscription Component, Mapping Component and Reporting Component, for example. The Server Component may establish a connection to destination servers which may be associated with vendors. The Server Component may utilize FIX messaging to provide a performant, industry standard messaging protocol and further allow moving away from vendor proprietary messaging protocols. Using FIG. 1 as an example, Server Component may be represented by 124, subscription component may be represented by 128 while 126 may include mapping component and reporting component.

The Subscription Component may load symbols from pre-defined watch lists or may be dynamically configured, create IDP subscriptions and send incoming IDP messages to mapping component. The Subscription Component may utilize an API, such as an OpenMAMA API, which is a general purpose, high performant Market Data Access API. This may be considered vendor agnostic and further supported via Open Source. Other APIs and/or middleware may be implemented and supported by the various embodiments of the present invention.

The Mapping Component may define how to map IDP messages into a destination (Vendor) server required message format.

The Reporting Component may subscribe to a request topic to handle intraday operational requests. In addition, the Reporting Component may publish the last value for contributed message to a cache. This provides out-of-band monitoring and management. Decoupling these components reduces complexity and exposes features that would otherwise impact throughput and Total Cost of Ownership (TCO).

Figure 2:
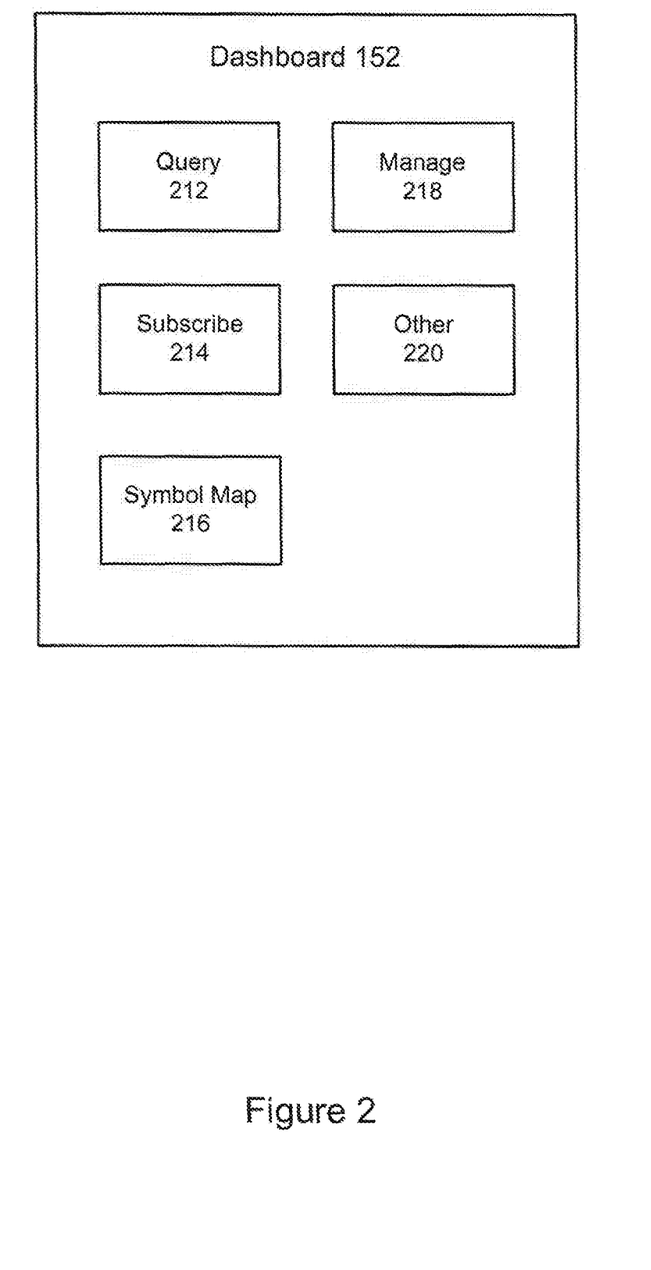
FIG. 2 is an exemplary user interface of a Monitoring Dashboard, according to an embodiment of the present invention.

FIG. 2 is an exemplary user interface of a Dashboard, according to an embodiment of the present invention. Dashboard 152 of FIG. 1 may provide user actions including Query 212. Subscribe 214, Symbol Map 216, Manage 218 and/or functionality represented by Other 220.

Figure 4:
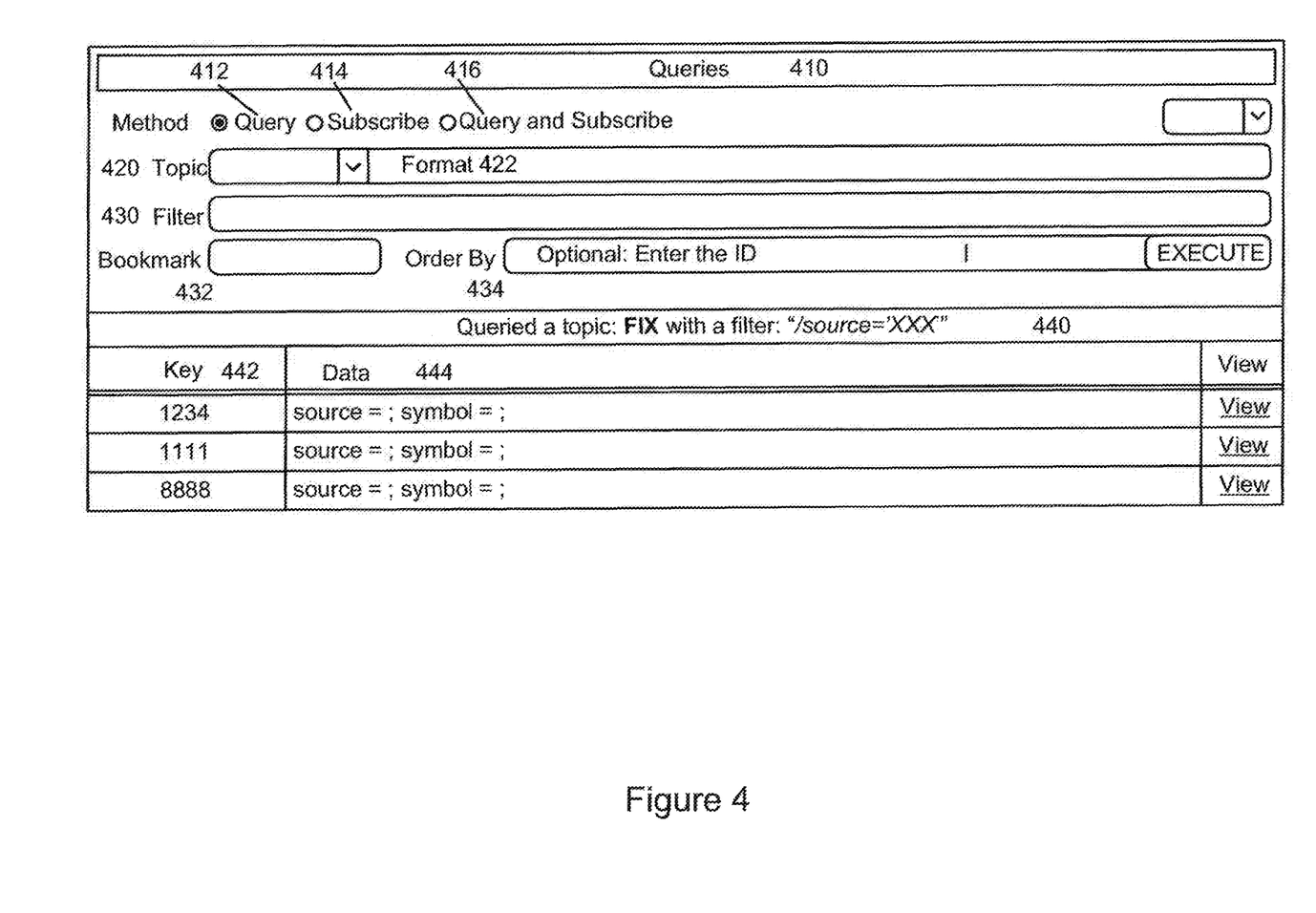
FIG. 4 is an exemplary screenshot, according to an embodiment of the present invention.

Dashboard 152 may enable a user to monitor and manage data that is contributed to external vendors. Query 212 may enable a query of the latest market data update from a cache. For example, the Data Bridge may publish each outbound message to a topic. By querying the corresponding topic in the dashboard, it returns the last value of each symbol in the cache. A filter may be applied to query for a specific source or symbol. For example, a user may submit a query for all the symbols with a source equal to a region, such as North America. The contributed data may be in FIX format. For example, FIG. 4 illustrates an exemplary Dashboard interface, according to an embodiment of the present invention. Queries may be executed, as shown by 410. Other options may include Subscribe 414 and Query and Subscribe 416. In this example, Query may be selected at 412. Topic may be selected at 420 and a filter may be applied at 430. In this example, the filter may be limited to a region, such as North America. Format may be selected at 422. In this example, the contributed data may be displayed in FIX format. Results may be provided at 440 with a header "Queried a topic: FIX with a filter: XXX." Results may be identified by Key 442 and Data 444.

Subscribe 214 may enable subscriptions to market data updates stream. For example, a user may create subscriptions to receive future updates with the dashboard instead of refreshing the query to get the last value. In addition, new incoming data may be appended to board or other interface. For example, an exemplary subscription may involve subscribing to a symbol "JPFUTREE" for new updates. As shown in FIG. 4, Subscribe may be selected at 414. A symbol may be identified at Filter 430. Results may be provided at 440 with a header "Subscribed to a topic: FIX with a filter: XXX." Results may be identified by Key 442 and Data 444.

Symbol Map 216 may identify a mapping between sources. For example, the symbol ticker between internal data and the external vendor may not be the same. By querying the market data with a filter, it may provide the name mapping. As shown in FIG. 4, Query may be selected at 412 and a Vendor Ticker may be identified at Filter 430.

Results may be provided at 440 with a header "Queried a topic: FIX with a filter: XXX." Results may be identified by Key 442 and Data 444.

For example, an embodiment of the present invention may publish inbound and outbound statistics to Dashboard through topics, such as statistics or STATS. Inbound may refer to the data that the Data Bridge receives from upstream data subscription, and outbound may refer to data that the Data Bridge contributes to the external Vendor. This may be used to monitor the state of the application and the data volume. As shown in FIG. 4, Subscribe may be selected at 414, a topic may be identified as JSON at 420 and a format may be identified as "STATS" at 422. Results may be provided at 440 with a header "Subscribed to a topic STATS." Results may be identified by Key 442 and Data 444. Detailed view for statistics may provide a number of active subscriptions, updates (e.g., in last 30 seconds), maximum number of updates in predetermined internals (e.g., 30 seconds interval) and total updates. Other metrics and analytics may be provided.

Manage 220 may provide subscription requests. Data Bridge maintains an active subscription to a topic called SUB_REQUESTS, which collects and processes any dynamic user requests without restart the application. For example, a user may change logging level, enable or disable instruments contribution, refresh instruments, reload symbology. As shown in FIG. 4, Query may be selected at 412, a topic may be identified at 420 and a format may be identified as "SUB_REQUESTS" at 422. Results may be provided at 440 with a header "Queried a Topic: SUB_REQUESTS." Results may be identified by Key 442 and Data 444.

Figure 3:
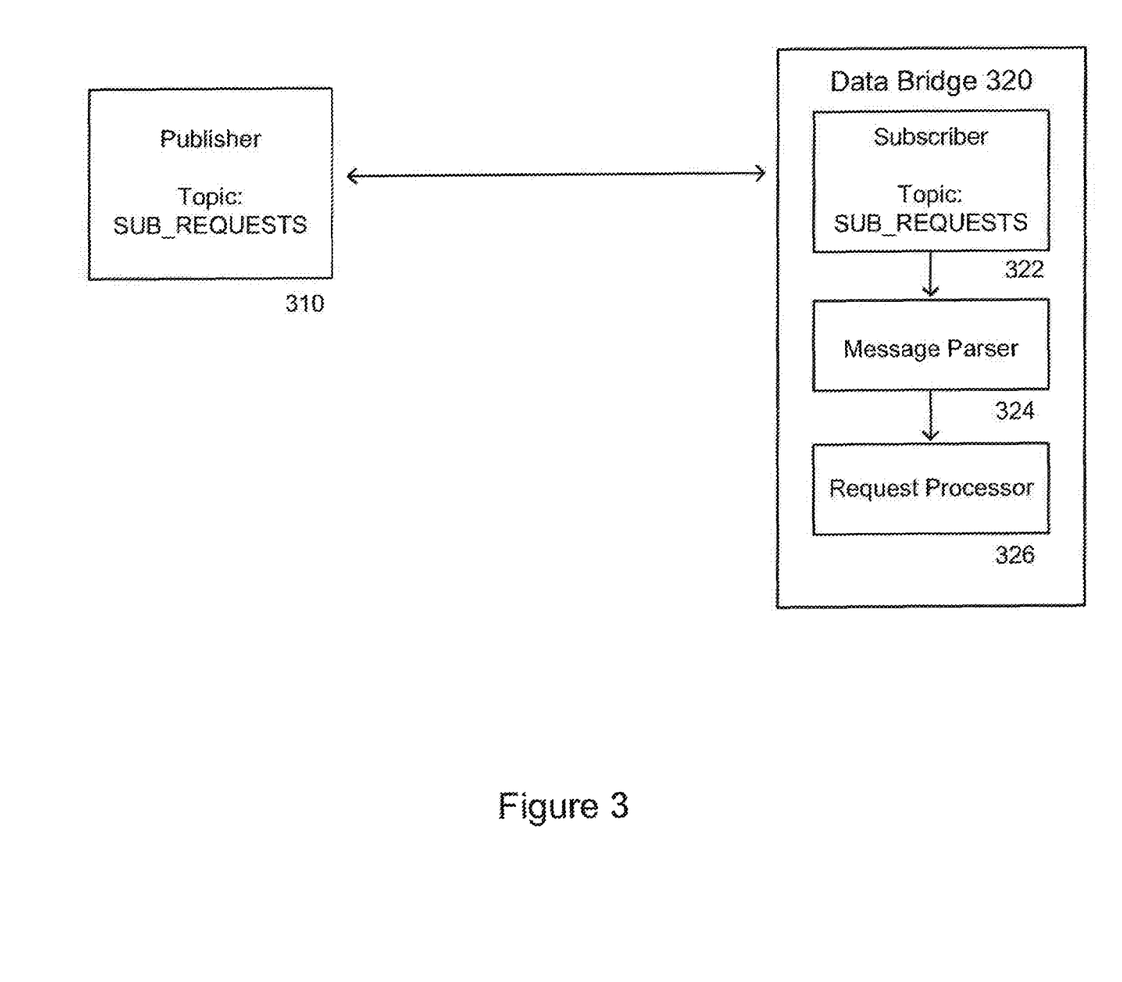
FIG. 3 is an exemplary flow diagram of control flow, according to an embodiment of the present invention.

FIG. 3 is an exemplary flow diagram of control flow, according to an embodiment of the present invention. FIG. 3 depicts how control commands may be sent into the Data Bridge. As shown in FIG. 3, an operator using a Dashboard or other tool to send commands to a main processing engine of an embodiment of the present invention. For example, the command may instruct an action it would not do as part of its normal operation. For example, the main processing engine may send updates to a vendor where an embodiment of the present invention may elect to have that symbol "restart" instead. FIG. 3 illustrates the details of a request for manage subscription. At 310, a Publisher may send requests to Data Bridge 320, which may be received directly or by a server or other intermediary. As shown in FIG. 3, Data Bridge 320 may include Subscriber 322, Message Parser 324 and Request Processor 326. As shown by 310, topic may represent a topic for collecting intraday operation requests which may include refresh symbols, enable/disable symbol contributions, etc.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a consolidated contribution data bridge tool, the system comprising:
   a first interface that communicates with an internal data distribution platform (IDP), the IDP generates transient data and stores fixed-term market data;
   a second interface that communicates with a plurality of vendors via a firewall, the plurality of vendors residing externally from the IDP;
   a third interface that communicates with one or more monitoring systems via a message bus for performing real-time monitoring of IDP messages published to the plurality of vendors; and
   a server, coupled to the first interface, the second interface and the third interface, the server comprising a processor programmed to perform the steps comprising:
     receiving, via the first interface, IDP messages comprising the transient data and fixed-term reference data, wherein the fixed-term reference data remain static for a fixed-term;
     identifying a mapping between the IDP messages and a message format associated with a destination vendor;
     establishing a network connection with the destination vendor residing externally from the IDP using a FIX messaging protocol;
     applying data normalization and transformation to the transient data and fixed-term reference data based on the mapping for generating contribution data;
     loading a plurality of symbols dynamically configured, and creating an IDP subscription using the dynamically configured plurality of symbols for transmitting an IDP message to the destination vendor, the IDP message including the contribution data;
     transmitting, via the second interface and through the firewall, the IDP message including the contribution data to the destination vendor for publication;
     transmitting, via the third interface, the IDP message including the contribution data to a real-time monitoring system for performing real-time monitoring;
     publishing a last value for the IDP message to a cache for performing out-of-band monitoring; and
     based on the real-time monitoring, causing at least one action to be performed, the at least one action including re-sending the contribution data to the plurality of vendors.

2. The system of claim 1, wherein the internal data distribution platform receives publication and subscription data.

3. The system of claim 1, wherein data encryption specific to the destination vendor requirements are applied.

4. The system of claim 1, wherein the processor is programmed to perform the step of:
   applying a transmission protocol to transmit the contribution data including normalized and transformed transient data and fixed-term reference data to the destination vendor.

5. The system of claim 1, wherein the real-time monitoring system comprises an interactive interface to perform one or more queries.

6. The system of claim 1, wherein the real-time monitoring system enables a query of a transient data update.

7. The system of claim 1, wherein the real-time monitoring system enables a subscription to transient data updates.

8. The system of claim 1, wherein the real-time monitoring system enables a symbol map between sources.

9. The system of claim 1, wherein the real-time monitoring system provides a monitor of inbound and outbound data statistics.

10. A method that implements a consolidated contribution data bridge tool, the method comprising the steps of:
   receiving, via a first interface, internal data distribution platform (IDP) messages comprising transient data and fixed-term reference data, wherein the first interface that communicates with an internal data distribution platform (IDP), and wherein the fixed-term reference data remain static for a fixed-term;
   identifying a mapping between the IDP messages and a message format associated with a destination vendor;
   establishing a network connection with the destination vendor residing externally from the IDP using a FIX messaging protocol;
   applying data normalization and transformation to the transient data and fixed-term reference data based on the mapping for generating contribution data;
   loading a plurality of symbols dynamically configured, and creating an IDP subscription using the dynamically configured plurality of symbols for transmitting an IDP message to the destination vendor, the IDP message including the contribution data;
   transmitting, via a second interface and through the firewall, the IDP message including the contribution data to the destination vendor for publication, wherein the second interface that communicates with a plurality of vendors;

transmitting, via a third interface, the IDP message including the contribution data to a real-time monitoring system for performing real-time monitoring, wherein the third interface that communicates with one or more monitoring systems;

publishing a last value for the IDP message to a cache for performing out-of-band monitoring; and based on the real-time monitoring, causing at least one action to be performed, the at least one action including re-sending the contribution data to the plurality of vendors.

11. The method of claim 10, wherein the internal data distribution platform receives publication and subscription data.

12. The method of claim 10, wherein data encryption specific to the destination vendor requirements are applied.

13. The method of claim 10, further comprising the step of:

applying a transmission protocol to transmit the transient data and reference data to the destination vendor.

14. The method of claim 10, wherein the real-time monitoring system comprises an interactive interface to perform one or more queries.

15. The method of claim 10, wherein the real-time monitoring system enables a query of a transient data update.

16. The method of claim 10, wherein the real-time monitoring system enables a subscription to transient data updates.

17. The method of claim 10, wherein the real-time monitoring system enables a symbol map between sources.

18. The method of claim 10, wherein the real-time monitoring system provides a monitor of inbound and outbound data statistics.

* * * * *